United States Patent [19]

Raue et al.

[11] Patent Number: 4,542,224
[45] Date of Patent: Sep. 17, 1985

[54] PROCESS FOR PREPARING CATIONIC METHINE DYESTUFFS

[75] Inventors: Roderich Raue; Hans-Peter Kühlthau, both of Leverkusen, Fed. Rep. of Germany

[73] Assignee: Bayer Aktiengesellschaft, Leverkusen, Fed. Rep. of Germany

[21] Appl. No.: 481,698

[22] Filed: Apr. 4, 1983

[30] Foreign Application Priority Data

Apr. 16, 1982 [DE] Fed. Rep. of Germany ....... 3213966

[51] Int. Cl.⁴ .................. C07D 209/14; C07D 209/18; C07D 405/06
[52] U.S. Cl. ..................................... 548/455; 548/511; 548/467
[58] Field of Search ................. 548/511, 455; 542/467

[56] References Cited

U.S. PATENT DOCUMENTS

| 3,346,571 | 10/1967 | Spatz et al. | 548/511 |
| 3,514,453 | 5/1970 | Spatz et al. | 548/455 |
| 3,541,089 | 11/1970 | Heseltine et al. | 548/511 |
| 3,812,108 | 5/1974 | Brack et al. | 542/457 |
| 3,955,984 | 5/1976 | Kobayashi et al. | 542/457 |
| 3,957,767 | 5/1976 | Kaeppeli | 542/457 |
| 3,980,430 | 9/1976 | Kuhlthau | 8/168 R |

FOREIGN PATENT DOCUMENTS 837655 7/1976 Belgium .
2200027 7/1972 German Democratic Rep. .

Primary Examiner—Glennon H. Hollrah
Assistant Examiner—D. B. Springer
Attorney, Agent, or Firm—Sprung Horn Kramer & Woods

[57] ABSTRACT

Cationic methine dyestuffs of the formula

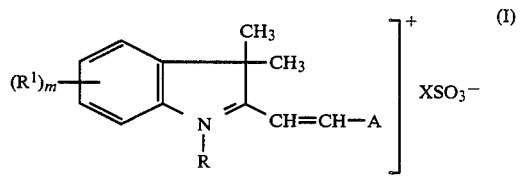

5 Claims, No Drawings

PROCESS FOR PREPARING CATIONIC METHINE DYESTUFFS

The invention relates to a process for preparing cationic methine dyestuffs of the general formula

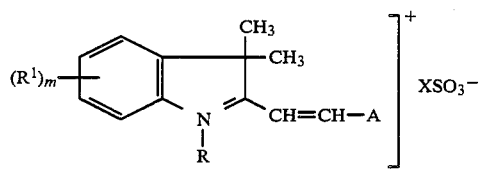

in which
R represents an alkyl radical which has 1 to 4 C atoms and is optionally substituted by hydroxyl, alkoxy having 1 to 4 C atoms, acyloxy, halogen, cyano, carboxyl, $C_1$- to $C_4$-carbalkoxy, carboxamido or acetyl, $R^1$ represents hydrogen, alkyl having 1 to 4 C atoms, halogen, alkoxy having 1 to 4 C atoms, hydroxyalkoxy having 2 to 4 C atoms, an optionally halogen-, $C_1$- to $C_4$-alkyl- or $C_1$- to $C_4$-alkoxy-substituted phenoxy, benzyloxy or benzyl radical, carboxyl, an alkyl carboxylate having 1 to 4 C atoms, a carboxamide group which is optionally substituted by 1 or 2 $C_1$- to $C_4$-alkyl radicals, a sulphonamide group which is optionally substituted by 1 or 2 $C_1$- to $C_4$-alkyl radicals, alkylsulphonyl having 1 to 4 C atoms, phenylsulphonyl or a cyano, trifluoromethyl, acetyl or benzoyl group, A represents a radical of the formula

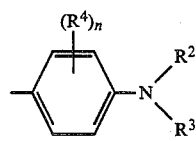

in which the radicals
$R^2$ and $R^3$ independently of each other represent an alkyl radical which has 1 to 4 C atoms and is optionally substituted by hydroxyl, $C_1$- to $C_4$-alkoxy, halogen, cyano, phenyl, carbalkoxy having 1 to 4 C atoms, carboxamido, acyloxy, benzyloxy, sulphonamido or acylamino, $R^2$ also represents an optionally halogen-, $C_1$- to $C_4$-alkyl- or $C_1$- to $C_4$-alkoxy-substituted phenyl or benzyl radical, or together with the adjacent C atom of the benzene ring can form a 5- or 6-ring which contains partially hydrogenated N and optionally O, and $R^4$ denotes hydrogen, an alkyl radical having 1 to 4 C atoms, an alkoxy radical having 1 to 4 C atoms or halogen, or a radical of the formula

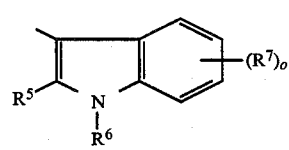

in which $R^5$ represents an alkyl radical having 1 to 4 C atoms, an optionally halogen-, $C_1$- to $C_4$-alkyl- or $C_1$- to $C_4$-alkoxy-substituted phenyl radical or a carbalkoxy radical having 1 to 4 C atoms, $R^6$ represents hydrogen or an alkyl radical which has 1 to 4 C atoms and is optionally substituted by hydroxyl, halogen, alkoxy having 1 to 4 C atoms, cyano or acyloxy, and $R^7$ represents hydrogen, halogen, $C_1$- to $C_4$-alkyl, $C_1$- to $C_4$-alkoxy, carbalkoxy having 1 to 4 C atoms, $C_1$- to $C_4$-alkylsulphonyl, phenylsulphonyl, acetyl or benzoyl, or a radical of the formula

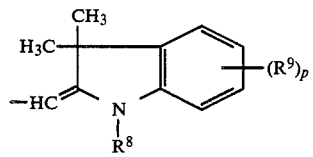

in which
$R^8$ and $R^9$ independently of each other have the same respective meaning as R and $R^1$ in the formula (I),
in which
X denotes aryl, alkyl having 1–4 C atoms or alkoxy having 1–4 C atoms, and
m, n, o and p independently of one another denote 1 to 4,
by condensing a methylene compound of the formula

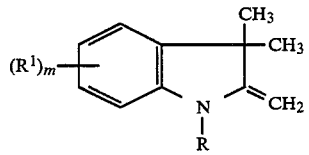

or a salt of the formula

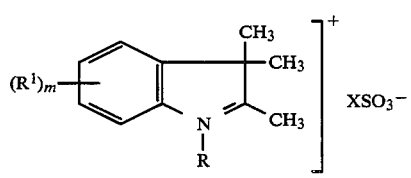

in which
R, $R^1$, X and m have the same meaning as in the formula (I),
with a compound of the formula

A—CHO (VII)

in which
A has the meaning given in the formula (I), and acids, characterised in that the condensation of compound (V) with 1–7 mols of an acid of the formula $XSO_3H$ (VIII)

and of compound (VI) with 0–6 mols of an acid (VIII) is carried out in the presence of 0–30% by weight of an organic solvent and of 0–15% by weight of water (both weights relative to the total weight of components (V) and (VII) or (VI) or (VII).

In a preferable embodiment, no organic solvent is added. The preferred water content is 0–10%, in particular 0–3%.

Acids to be mentioned in particular are those of the formula (VIII) in which
- X represents a phenyl radical which is optionally substituted by 1 to 3 alkyl radicals having 1 to 4 C atoms, alkoxy radicals having 1 to 4 C atoms, halogen or hydroxyl, or the methyl group.

A preferable group of dyestuffs which can be prepared by the new process is of the general formula

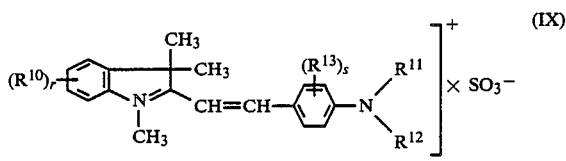

in which
- $R^{10}$ represents hydrogen, chlorine, methyl, methoxy, ethoxy or carbomethoxy,
- $R^{11}$ and $R^{12}$ independently of each other represent an alkyl radical which has 1 to 4 C atoms and is optionally substituted by hydroxyl, methoxy, ethoxy, chlorine, cyano, phenyl or acyloxy, and
- $R^{11}$ also designates a phenyl radical which is optionally substituted by chlorine, methyl, methoxy or ethoxy, or together with the adjacent C atom of the benzene ring can form a 5- or 6-ring which contains partially hydrogenated N and optionally O,
- $R^{13}$ denotes hydrogen, methyl, chlorine, methoxy or ethoxy,
- r and s denote 0, 1 or 2, and
- X has the same meaning as in the formula (I).

In particular, compounds (V) and (VII) or (VI) and (VII) are reacted in equimolar amounts.

In the above formulae halogen preferably represents fluorine, chlorine or bromine.

Acyl is understood as meaning in particular acetyl, propionyl, benzoyl or carbamoyl.

The radicals $R^2$ and $R^{11}$ if closed to give a ring together with the carbon atom of the benzene ring which is in o-position relative to the nitrogen atom, can form together with the benzene ring and the nitrogen atom, for example, an optionally $C_1$-$C_4$-alkyl-substituted indoline, tetrahydroquinoline, phenomorpholine or tetrahydroquinoxaline ring.

The reaction is carried out in a solid-phase reactor having rotating internal fitments.

Particularly suitable are reaction screws, kneading machines, paddle dryers or an all-phase reactor, which is described, for example, in "Chemische Rundschau" 26 (1973), page 7.

The advantage of the new process is that, without passing through an aqueous phase from which the dyestuff has to be isolated by salting out, filtering off and drying, a marketable dyestuff is obtained directly. The new process does not therefore produce effluent, and the labour- and energy-intensive drying of a dyestuff isolated from a solution is dispensed with.

If a paddle dryer is used as the reaction vessel, marketable dyestuff formulations can be obtained directly by adding the customarily added standardising agent, such as sodium sulphate, sodium chloride or dextrin, before, during or after the reaction. The addition of inorganic salts, in particular sodium sulphate, right at the start of the reaction is an advantage, since this prevents crusting on the reactor walls.

In a further preferable procedure, sufficient water or organic solvent miscible with water is added to the dyestuff melt prepared without the addition of inorganic salts that a stable concentrated liquid formulation of the dyestuff containing 10–50% of dyestuff is obtained directly.

A surprising advantage also consists in the fact that the reaction proceeds almost quantitatively under the conditions according to the invention, so that dyestuffs are obtained in surprisingly high purity without further purification process.

In a further preferable process variant, the preparation of compounds (VI) is embraced in the reaction. For this purpose, compounds of the general formula

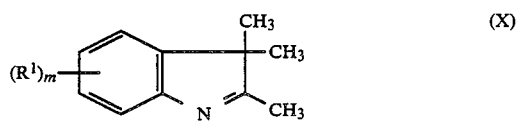

in which
$R^1$ and m have the same meaning as in the formula I, are reacted in the presence of the abovementioned amounts of inorganic solvents and water with compounds of the formula

wherein
X and R have the meaning mentioned in the formula (I),
to give compounds of the formula (VI), and the latter are condensed without intermediate isolation with compounds of the formula (VII) to give dyestuffs of the general formula (I).

In a particularly preferable procedure, compounds of the formula (I) are obtained directly by reacting compounds of the formula (VII), (X) and (XI) in a reaction apparatus which is capable of homogeneously mixing viscous and subsequently crystallising dyestuff melts.

Intermediate products of the formulae (V), (VII) and (X) which are suitable for the process are found in many patent specifications, of which may be mentioned, inter alia, German Patent Specifications Nos. 614,325, 615,130, 711,665, 721,020, 730,336, 742,039, 744,019, 891,120, 1,070,316 and 1,099,670, German Auslegeschriften Nos. 1,044,022, 1,049,994, 1,158,646, 1,569,734, 2,031,202, 2,040,872 and 2,234,468, German Offenlegungsschriften Nos. 1,929,417, 2,040,652, 2,040,653, 2,064,881, 2,064,882, 2,101,223, 2,130,790, 2,135,834, 2,200,027, 2,202,300, 2,243,627 and 2,726,437, U.S. Pat. Nos. 2,815,338, 3,394,130, 3,865,837 and 3,888,850, Japanese Patent Specifications Nos. 3,217-69, 13,748-66, 19,951-65, 49-14,525, 49-72,477, 49-74,217, 50-05,683, 73-12,460, 73-13,752, 74-04,531 and 76-35,405, French Patent Specification No. 1,261,976 and Belgian Patent Specification No. 734,765.

Examples of suitable acids of the formula (VIII) are benzenesulphonic acid, 2-methylbenzenesulphonic acid, 4-methylbenzenesulphonic acid, 2,4-dimethylbenzenesulphonic acid, 2-chlorobenzenesulphonic acid, 4-chlorobenzenesulphonic acid, 2,4-dichlorobenzenesulphonic acid, 4-hydroxybenzenesulphonic acid, 4-methoxybenzenesulphonic acid, naphthalene-1-sulphonic acid, naphthalene-2-sulphonic acid, methanesulphonic acid, ethanesulphonic acid butanesulphonic acid.

The reaction can also be carried out in the presence of a solvent which is removed from the reaction vessel by distillation either during the reaction or when the reaction has ended.

Possible solvents are toluene, xylene, chlorobenzene, o-dichlorobenzene or acetone.

Examples of solvents which are suitable for converting dyestuff melts into stable, highly concentrated solutions when the condensation is ended are ethylene glycol, propylene glycol, methylglycol, ethylglycol, butylglycol, methylglycol acetate, ethylglycol acetate, butylglycol acetate, ethylene glycol diacetate, glycerol monoacetate, glycerol triacetate, ethylene glycol dimethyl ether, ethylene glycol diethyl ether, diethylene glycol dimethyl ether, diethylene glycol diethyl ether and lower aliphatic monocarboxylic acids, such as acetic acid, lactic acid and glycolic acid.

These solvents are preferably used mixed with water.

Examples of suitable compounds of the general formula (XI) are methyl benzenesulphonate, ethyl benzenesulphonate, butyl benzenesulphonate, methyl 2-methylbenzenesulphonate, methyl 4-methylbenzenesulphonate, ethyl 4-methylbenzenesulphonate, methyl 4-chlorobenzenesulphonate, methyl methanesulphonate, ethyl methanesulphonate, dimethyl sulphate, diethyl sulphate and dibutyl sulphate.

The reaction is carried out at temperatures between 40° and 120° C., the preferable temperature range being 60°–110° C.

Dyestuff salts prepared according to the invention are suitable for dyeing mordanted cotton, and acid-modified polyamide and polyester fibres, but in particular for dyeing polyacrylonitrile fibre materials, and they are also suitable for dyeing paper containing mechanical wood pulp and leather and for manufacturing ball-point pen pastes, inks and rubber-stamp colours.

EXAMPLE 1

1,730 g of 1,3,3-trimethyl-2-methylene-indoline and 1,770 g of 4-diethylaminobenzaldehyde are mixed at 60° C. in a laboratory paddle dryer which is equipped with beater bars. 1,720 g of 4-methylbenzenesulphonic acid are then added, whereupon the temperature rises up to a value of 74° C. The reaction mixture is then heated to 100° C. and maintained at this temperature for 6 hours. The paddle dryer is then allowed to run without heat supply overnight, during which period the dyestuff crystallises and is ground to a fine powder. 4,500 g are obtained of the dyestuff of the formula

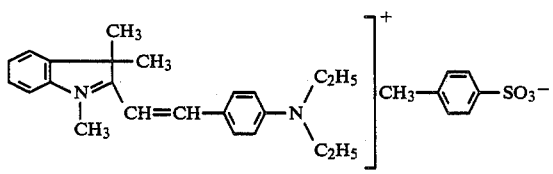

which dyes polyacrylonitrile fibres red-violet (C.I. hue indication chart No. 10).

EXAMPLE 2

In a laboratory paddle dryer, 1,730 g of 1,3,3-trimethyl-2-methylene-indoline and 1,880 g of 4-(N-methyl-N-β-cyanoethylamino)-benzaldehyde are stirred at 55° C., and 1,720 g of 4-methylbenzenesulphonic acid are then added. This addition raises the temperature to 72° C. The reaction mixture is heated to 100° C., and the paddle dryer is then allowed to run at 100° C. for 24 hours and then without heat supply for a further 12 hours. 4,850 g are obtained of the dyestuff of the formula

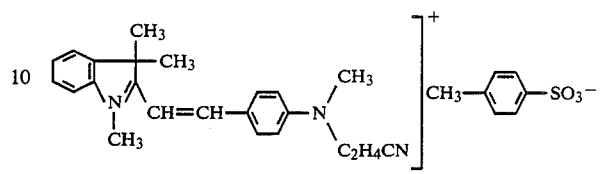

which dyes polyacrylonitrile in a bright yellowish-tinged red (C.I. hue indication chart No. 49).

EXAMPLE 3

1,730 g of 1,3,3-trimethyl-2-methylene-indoline and 1,490 g of 4-dimethylaminobenzaldehyde are mixed at 50° C. in a laboratory paddle dryer, and 1,720 g of 4-methylbenzenesulphonic acid are added. This addition raises the temperature up to a value of 66° C. The reaction mixture is then heated to 100° C., and the paddle dryer is allowed to run at 100° C. for 24 hours and then without heat supply for 12 hours. 4,450 g are obtained of the dyestuff of the formula

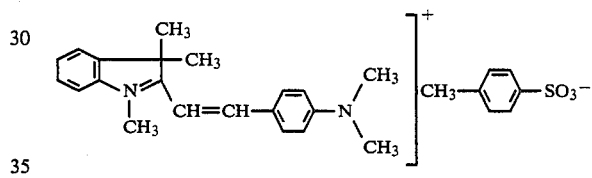

which dyes polyacrylonitrile fibres blueish-tinged red (C.I. hue indication chart No. 9).

EXAMPLE 4

245 g of 4-(N-methyl-N-(p-ethoxyphenyl)-amino)-benzaldehyde are mixed with 173 g of 1,3,3-trimethyl-2-methylene-indoline at 70° C. in a laboratory paddle dryer, and 162 g of melted benzenesulphonic acid are then stirred in. During this addition the temperature of the melt rises to 103° C. The melt crystallises after stirring at 95°–100° C. for 30 minutes, and is then ground at 95° for a further 3 hours. The pulverulent dyestuff obtained has the formula

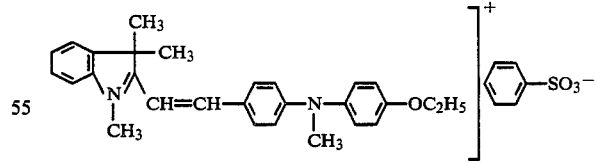

It dyes polyacrylonitrile red-violet (C.I. hue indication chart No. 11).

EXAMPLE 5

231 g of methyl 1,3,3-trimethyl-2-methyleneindoline-5-carboxylates and 149 g of p-dimethylaminobenzaldehyde are mixed at 50° C. in a laboratory paddle dryer. 110 g of methanesulphonic acid are added dropwise. During this addition the temperature of the melt rises to 99° C. The melt crystallises after a few minutes. The dyestuff is ground at 95° C. for a further 3 hours. It corresponds to the formula

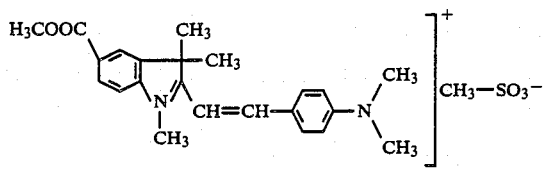

and dyes polyacrylonitrile violet (C.I. hue indication chart No. 11).

EXAMPLE 6

The instructions for Example 5 are followed, except that methanesulphonic acid is replaced by 170 g of melted benzenesulphonic acid. When benzenesulphonic acid has been added, the temperature of the mixture rises to 120° C. within 2 minutes, during which period the dyestuff crystallises. It is ground at 95° C. for 2 hours, and is then free of starting product. The dyestuff corresponds to the formula

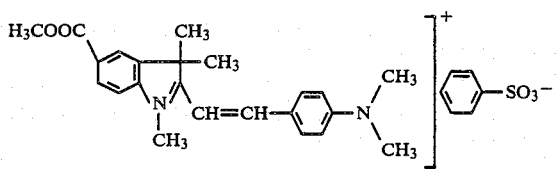

and dyes acid-modified polyester fibres violet (C.I. hue indication chart No. 11).

EXAMPLE 7

451 g of 4-(N-ethyl-N-β-chloroethylamino)-2-methylbenzaldehyde are mixed with 346 g of 1,3,3-trimethyl-2-methylene-indoline at 40° C. in a laboratory paddle dryer, and 320 g of melted benzenesulphonic acid are added. During this addition the temperature of the melt rises to 102° C. The melt crystallises on further stirring at 95°–100° C. for a further 15 minutes, and is then ground at this temperature for a further 2 hours. The dyestuff obtained is of the formula

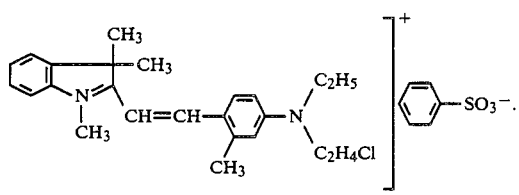

It dyes polyacrylonitrile blueish-tinged red (C.I. hue indication chart No. 11).

EXAMPLE 8

In a laboratory paddle dryer, 395 g of 4-(N-methyl-N-β-chloroethylamino)-benzaldehyde is mixed at 50° C. with 346 g of 1,3,3-trimethyl-2-methylene-indoline, and 316 g of melted benzenesulphonic acid are then stirred in. The temperature of the melt immediately rises to 106° C. The melt is stirred at 95°–100° C. for 3 hours, and then crystallises. The dyestuff is ground at 95° C. for a further 6 hours. It has the formula

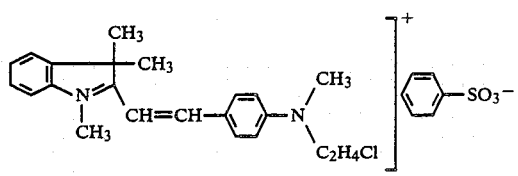

and dyes polyacrylonitrile blueish-tinged red (C.I. hue indication chart No. 50).

EXAMPLE 9

In a laboratory paddle dryer, 451 g of 1,3,3-trimethyl-2-methylene-indoline-ω-aldehyde and 346 g of 1,3,3-trimethyl-2-methylene-indoline are mixed at 45° C., and 340 g of melted benzenesulphonic acid are then added. During this addition the temperature of the melt rises to 95° C. The melt is stirred at 95°–100° C. for 1 hour, and then crystallises. The dyestuff is then ground at this temperature for a further 6 hours to give a fine powder. It has the formula

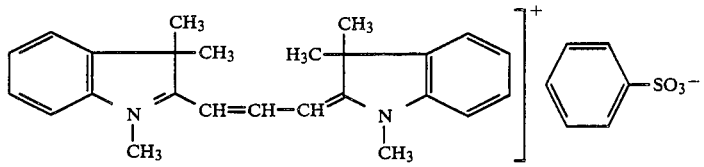

and dyes paper blueish-tinged red (C.I. hue indication chart No. 51).

EXAMPLE 10

376 g of 4-(N-methyl-N-β-cyanoethylamino)-benzaldehyde and 346 g of 1,3,3-trimethyl-2-methylene-indoline are mixed at 50° C. in a laboratory paddle dryer. 316 g of melting benzenesulphonic acid are then allowed to flow in, during which addition the temperature of the mixture rises to 106° C. The melt crystallises after having been stirred at 95° C. for 4 hours. It is ground at 95° C. for a further hour to give a fine powder. The dyestuff obtained is of the formula

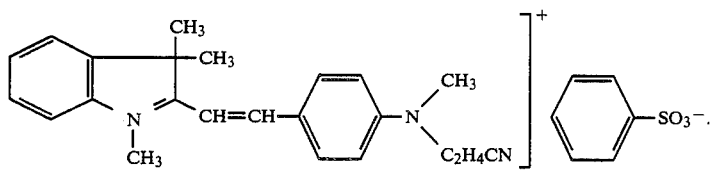

It dyes polyacrylonitrile yellowish-tinged red (C.I. hue indication chart No. 49).

EXAMPLE 11

307 g of 4-(N-ethyl-N-β-chloroethylamino)-2-methylbenzaldehyde, 197 g of 4-(N-methyl-N-β-chloroethylamino)-benzaldehyde and 409 g of 1,3,3-trimethyl-2-methylene-indoline are stirred at 40° C. in a laboratory paddle dryer, and 368 g of melted benzenesulphonic acid are then added. The heating fluid of the paddle dryer is then heated to 100° C. within 25 minutes, and the melt obtained crystallises after a further 40 minutes. The dyestuff is ground at 100° C. for a further 2 hours to give a fine powder. The powder obtained is a mixture of the dyestuffs of Examples 7 and 8. It dyes polyacrylonitrile in a strong blueish-tinged red (C.I. hue indication chart No. 10).

EXAMPLE 12

In a laboratory paddle dryer, 150 g of methyl 1,3,3-trimethyl-2-methylene-indoline-5-carboxylate and 166 g of 4-(N-methyl-N-(p-ethoxyphenyl)-amino)-benzaldehyde are mixed at 70° C., and 110 g of melted benzenesulphonic acid are then added. During this addition the temperature of the mixture rises to 97° C. and a homogeneous melt results. This melt crystallises after stirring at 95° C. for 20 minutes, and is then ground at 95° C. for a further 4 hours to give a fine powder. The dyestuff thus obtained is of the formula

EXAMPLE 13

In a laboratory paddle dryer, 354 g of 4-diethylaminobenzaldehyde are dissolved in 346 g of 1,3,3-trimethyl-2-methylene-indoline at 34° C., and 340 g of melted benzenesulphonic acid are then added. During this addition the temperature of the solution rises to 103° C. After stirring at 95° C. for 10 minutes the material crystallises accompanied by a renewed temperature increase to 104° C. It is ground at 95° C. in the paddle dryer to give a fine powder which is the dyestuff of the formula

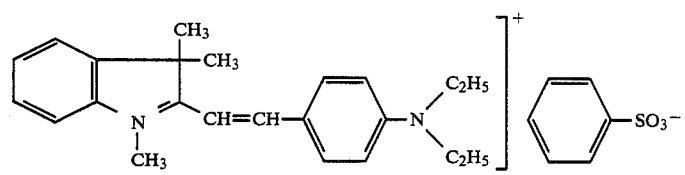

which dyes polyacrylonitrile strong blueish-tinged red. (C.I. hue indication chart No. 10).

EXAMPLE 14

In a laboratory paddle dryer, 298 g of 4-dimethylaminobenzaldehyde and 346 g of 1,3,3-trimethyl-2-methylene-indoline are mixed, and 316 g of melted benzenesulphonic acid are then added. During this addition the temperature of the melt rises to 100° C. The dyestuff crystallises on stirring at 95° C. for 1 hour. It is ground at this temperature in the paddle dryer to give a fine powder. The dyestuff is of the formula

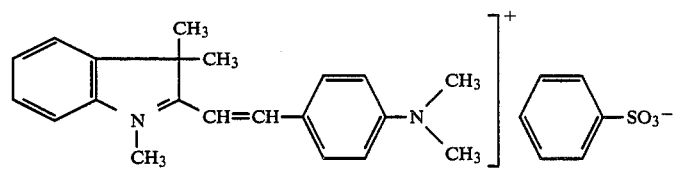

and dyes polyacrylonitrile red (C.I. hue indication chart No. 9).

EXAMPLE 15

415 g of 1,3,3-trimethyl-2-methylene-indoline-ω-alde-

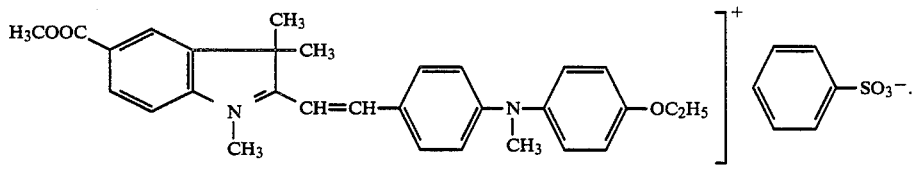

It dyes polyacrylonitrile violet (C.I. hue indication chart No. 12).

hyde and 346 g of 1,3,3-trimethyl-2-methylene-indoline are mixed at 30° C. in a laboratory paddle dryer. 200 g of methanesulphonic acid are then added dropwise. During this addition the temperature of the mixture rises to 70° C. The dyestuff crystallises on stirring at 80° C. for 1.5 hours. It is then pulverised at this temperature in the paddle dryer for a further 3 hours. It has the formula

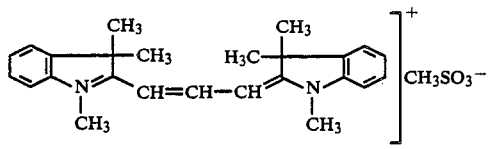

and is highly suitable for dyeing paper in blueish-tinged red shades. (C.I. hue indication chart No. 51).

EXAMPLE 16

173 g of 1,3,3-trimethyl-2-methylene-indoline and 245 g of 4-(N-methyl-N-(p-ethoxyphenyl)-amino)-benzaldehyde are stirred at 70° C. 100 g of methanesulphonic acid are then allowed to flow in. During this addition the temperature of the melt rises to 107° C. The melt is stirred for 6 hours in the paddle dryer, and then crystallises. The dyestuff obtained is ground to a powder. It has the formula

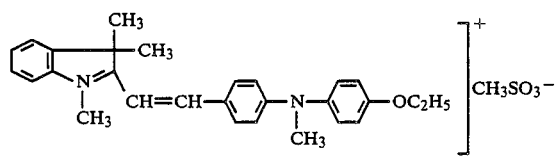

and dyes acid-modified polyester fibres red-violet (C.I. hue indication chart No. 11).

EXAMPLE 17

875 g of 1,3,3-trimethyl-2-methylene-indoline and 745 g of 4-dimethylaminobenzaldehyde are mixed at room temperature in a laboratory paddle dryer. 500 g of methanesulphonic acid are then allowed to flow in, during which addition the temperature of the mixture rises to 87° C. A crystalline dyestuff powder is obtained on further stirring at 95° C. for 7 hours. It contains the dyestuff of the formula

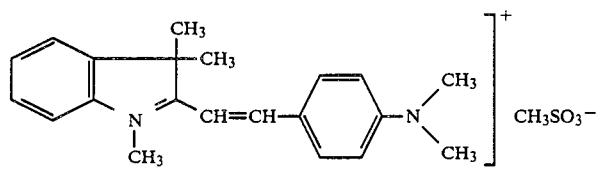

and dyes polyacrylonitrile red (C.I. hue indication chart No. 9).

EXAMPLE 18

708 g of 4-diethylaminobenzaldehyde and 700 g of 1,3,3-trimethyl-2-methylene-indoline are mixed in a laboratory paddle dryer, and 392 g of methanesulphonic acid are then allowed to flow in. During this addition the temperature of the melt rises to 98° C. A vacuum is applied and the product is ground overnight at 65° C. The blue crystalline powder obtained still contains about 0.1% of aldehyde and 0.1% of trimethylmethylene-indoline. It is the dyestuff of the formula

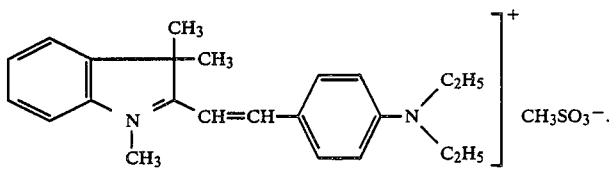

Owing to the fact that it is readily soluble in alcohols, it is very highly suitable for applications in the office supplies field.

EXAMPLE 19

376 g of 4-(N-methyl-N-β-cyanoethylamino)-benzaldehyde and 350 g of 1,3,3-trimethyl-2-methylene-indoline are mixed in a laboratory paddle dryer, and 700 g of a 65% strength aqueous solution of 4-phenolsulphonic acid are then poured in. The mixture is then heated to 95° C., and water is distilled off under a water jet vacuum. The product is then ground overnight in vacuo at 95° C. According to that the reaction proceeded quantitatively. A fine powder is obtained which contains the dyestuff of the formula

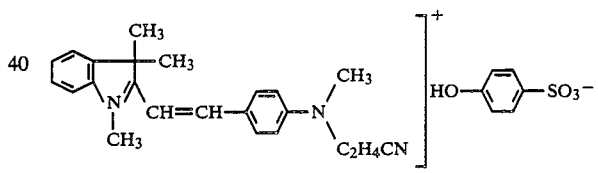

which dyes polyacrylonitrile in a bright yellowish-tinged red (C.I. hue indication chart No. 49).

EXAMPLE 20

235 g of 1-methyl-2-phenylindole-3-aldehyde and 203 g of 1,3,3-trimethyl-5-methoxy-2-methylene-indoline are mixed at 70° C. in a laboratory paddle dryer, and 159 g of melted benzenesulphonic acid are added. The mixture is then grounded at 95° C. for 24 hours under a water jet vacuum. This gives the crystalline dyestuff of the formula

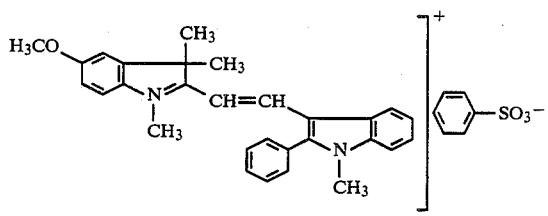

methylene-indoline at 40° C., and 18.5 g of methanesulphonic acid are then added dropwise. During this addition the temperature of the melt rises up to 80° C. When the melt has been stirred at 95° C. for 3 hours, it contains less than 0.5% of starting products. It is diluted with 85.1 g of water and 26.8 g of glacial acetic acid, and this gives a stable liquid formulation of the dyestuff of the formula

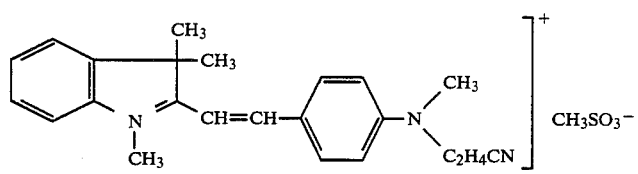

which dyes polyacrylonitrile yellowish-tinged red (C.I. hue indication chart No. 49).

A stable liquid formulation is also obtained when the procedure described above is followed but glacial acetic acid is replaced by propylene glycol.

A stable liquid formulation is also obtained by diluting the melt with 85.1 g of propylene glycol or ethylene glycol and 26.8 g of glacial acetic acid.

The condensation described above can be accelerated if the water of condensation is distilled off continuously by applying a vacuum. This makes the melt viscous, and it is kept well stirrable by the dropwise addition of 5 g of hydroxypropionitrile.

which dyes polyacrylonitrile reddish-tinged orange. (C.I. hue indication chart No. 6).

EXAMPLE 21

39.5 g of 4-(N-methyl-N-β-chloroethylamino)-benzaldehyde and 34.6 g of 1,3,3-trimethyl-2-methyleneindoline are stirred at 40° C., and 20 g of methanesulphonic acid are then added dropwise. During this addition the temperature of the melt rises up to 84° C. The melt is maintained at 95° C. for 3 hours, 48 g of water are added, and this gives a residue-free, highly concentrated solution of the dyestuff of the formula

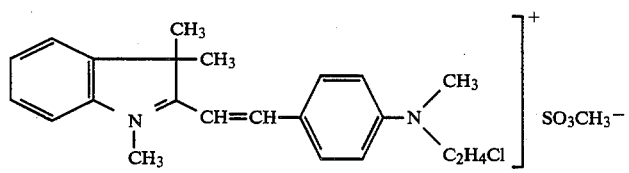

which dyes polyacrylonitrile blueish-tinged red (C.I. hue indication chart No. 50).

A stable, highly concentrated liquid formulation is also obtained when the procedure described above is followed, except that a mixture of 33 g of propylene glycol and 15 g of water is used in place of 48 g of water.

A mixture of 20 g of glacial acetic acid and 28 g of propylene glycol or ethylene glycol is also highly suitable.

The condensation described above is accelerated when it is carried out under vacuum, thereby removing the water of condensation continuously. Since this makes the melt very viscous, it is kept well stirrable by the dropwise addition of 5 g of hydroxypropionitrile.

EXAMPLE 22

34.7 g of 4-(N-methyl-N-β-cyanoethylamino)-benzaldehyde are stirred with 31.9 g of 1,3,3-trimethyl-2-

EXAMPLE 23

35.4 g of 4-diethylaminobenzaldehyde are stirred with 34.6 g of 1,3,3-trimethyl-2-methylene-indoline at 50° C., and 20 g of methanesulphonic acid are then added dropwise. During this addition the temperature of the mixture rises up to 105° C. When the mixture has been stirred at 95° C. for 2 hours, 108 g of water are added, and this gives, after cooling down, a residue-free solution of the dyestuff of the formula

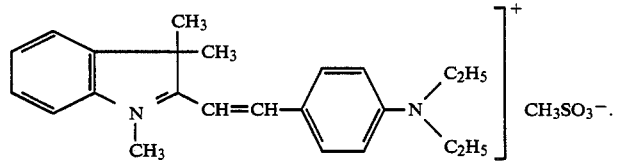

which dyes polyacrylonitrile strongly blueish-tinged red (C.I. hue indication chart No. 10).

EXAMPLE 24

The procedure given in Example 16 is followed, except that the stirring time is terminated after only 4 hours, that is before the melt has crystallised, and a solution of 160 g of glacial acetic acid in 285 g of water is then added. On cooling down this gives a residue-free, concentrated and stable solution of the dyestuff of Example 16, which is highly suitable for dyeing polyacrylonitrile.

EXAMPLE 25

87.5 of 1,3,3-trimethyl-2-methylene-indoline, 74.5 g of 4-dimethylaminobenzaldehyde and 50 g of methanesulphonic acid are reacted with one another as described in Example 17, but the stirring time is terminated after only 3 hours, that is before the melt has crystallised, 258 ml of water are added, and this gives on cooling down a residue-free solution of the dyestuff described in Example 17, which is highly suitable for use as a dye formulation for dyeing acid-modified synthetic fibres.

If water is replaced by a solution of 47 g of glacial acetic acid in 211 g of water or by a solution of 47 g of propylene glycol in 211 g of water or by a solution of 58 g of ethylene glycol in 200 g of water, this likewise gives liquid formulations which are free of residue and stable. Mixtures of glycols and glacial acetic acid are also highly suitable.

EXAMPLE 26

29.3 g of 4-(N-ethyl-N-$\beta$-chloroethylamino)-2-methylbenzaldehyde, 19.7 g of 4-(N-methyl-N-$\beta$-chloroethylamino)-benzaldehyde and 39.8 g of 1,3,3-trimethyl-2-methylene-indoline are stirred together at 40° C., and 23 g of methanesulphonic acid are then added dropwise. The melt is stirred at 95° C. for 6 hours, and is then dissolved in a solution of 36 g of propylene glycol in 34 g of water. This gives a residue-free stable liquid formulation which contains the dyestuffs of the formulae

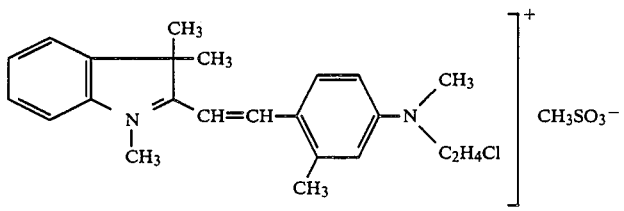

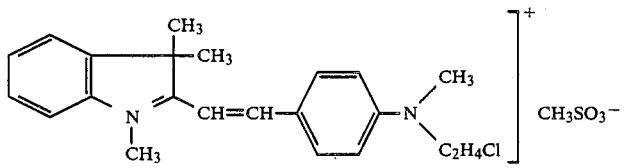

and is highly suitable for use as the formulation for dyeing polyacrylonitrile in a blueish-tinged red (C.I. hue indication chart No. 10).

A stable liquid formulation is also obtained when a mixture of 36 g of glacial acetic acid and 34 g of propylene glycol is used as solvent.

EXAMPLE 27

45.1 g of 4-(N-ethyl-N-$\beta$-chloroethylamino)-2-methylbenzaldehyde are stirred with 35 g of 1,3,3-trimethyl-2-methylene-indoline at 40° C., and 20.5 g of methanesulphonic acid are then allowed to flow in. During this addition the temperature of the melt rises up to 107° C. The water of condensation is then distilled off at 95° C. for 3 hours under a water jet vacuum. During this period the melt is kept readily stirrable by the dropwise addition of 5 g of $\beta$-hydroxypropionitrile. It is then dissolved in a mixture of 38 g of glacial acetic acid and 50 g of propylene glycol. This gives a residue-free stable liquid formulation of the dyestuff of the formula

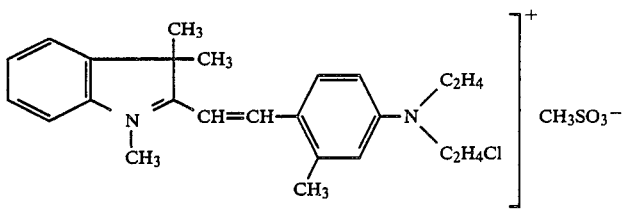

which dies polyacrylonitrile strongly blueish-tinged red. (C.I. hue indication chart No. 11).

EXAMPLE 28

35.4 g of 4-diethylaminobenzaldehyde are stirred with 35 g of 1,3,3-trimethyl-2-methylene-indoline, and 20.5 g of methanesulphonic acid are then poured in. The temperature of the melt rises to 91° C. It is then stirred at 50° C. Yet the condensation takes place exactly as in Example 23 when the water of condensation is continuously distilled off under a water jet vacuum. This makes the melt very viscous. To keep it readily stirrable, 5 g of $\beta$-hydroxypropionitrile and 10 g of 1,2-propanediol are added. After 3 hours the mixture is diluted with 39 g of glacial acetic acid and 49 g of propanediol, and cooled down, and this gives a residue-free stable liquid formulation of the dyestuff of Example 23.

EXAMPLE 29

318 g of 2,3,3-trimethylindolenine and 348 g of 4-diethylaminobenzaldehyde are mixed at 40° C. in a laboratory paddle dryer, and 344 g of methyl benzenesulphonate are added. The reaction mixture is gradually heated to 100° C. Dyestuff formation starts at 90° C., the temperature rising up to 105° C. The reaction mixture has crystallised after 45 minutes. The paddle dryer is allowed to run at 100° C. for 4 hours, 1 hour of which under an applied vacuum. 953 g are obtained of the dyestuff of the formula

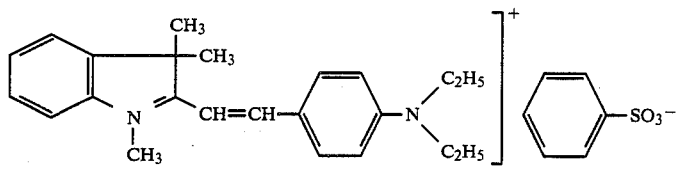

which dyes polyacrylonitrile materials red-violet. (C.I. hue indication chart No. 10).

EXAMPLE 30

In a laboratory paddle dryer, 318 g of 2,3,3-trimethylindolenine and 348 g of 4-diethylaminobenzaldehyde are mixed at 40° C., and 372 g of methyl 4-methylbenzenesulphonate are added. The reaction mixture is heated to 100° C. and stirred at this temperature for 12 hours. 500 g of propylene glycol and 500 g of water are then added, and the temperature is maintained at 100° C. for a further 3 hours. When the batch has cooled down to room temperature, it is filtered, and 1,980 g are obtained of a stable solution of the dyestuff described in Example 1, which dyes polyacrylonitrile materials red-violet.

EXAMPLE 31

195 g of 4-(N-methyl-N-β-cyanoethylamino)-benzaldehyde are stirred at 50° C. with 159 g of 2,3,3-trimethylindolenine in a laboratory paddle dryer, and 172 g of methyl benzenesulphonate are added. The temperature slowly rises up to 99° C. The paddle dryer is allowed to run at 100° C. for 7 hours, and 250 g of water and 250 g of β-hydroxypropionitrile are added to the reaction mixture. When the mixture has stirred at 100° C. for 3 hours it is cooled down, and filtered. 1,010 g are obtained of a solution of the dyestuff of the formula

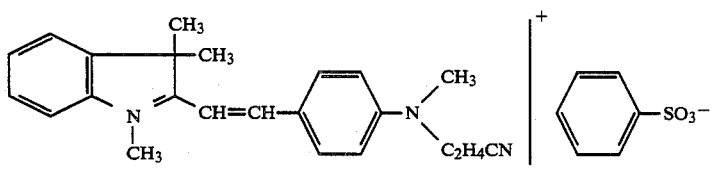

which dyes polyacrylonitrile fibres in bright red shades (C.I. hue indication chart No. 49).

EXAMPLE 32

354 g of 4-diethylaminobenzaldehyde are dissolved in 318 g of 2,3,3-trimethylindolenine in a laboratory paddle dryer. 252 g of dimethyl sulphate are then added at room temperature with efficient stirring. During this addition the temperature of the reaction mixture rises to 100° C. When the mixture has stirred at 95° C. for 30 minutes, a water jet vacuum is applied and the water of condensation is distilled off. The mixture is then stirred at 95° C. for a further 2 hours and then at 65° C. overnight in vacuo. This gives the dyestuff of the formula

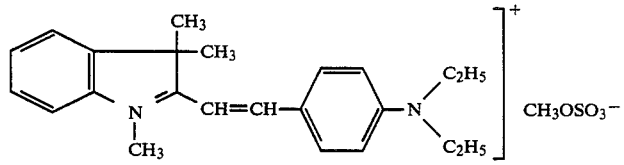

in the form of a fine powder. It dyes polyacrylonitrile strongly blueish-tinged red (C.I. hue indication chart No. 10).

EXAMPLE 33

143.2 g of dimethyl sulphate are added dropwise in the course of 30 minutes to 181.8 g of crude 2,3,3-trimethylindolenine which is 87.5% pure and contains 9% of water. During this addition care is taken, by means of slight cooling with water, that the temperature does not exceed 45° C. At the same time the pH is maintained at a value of 4–4.2 by the dropwise addition of concentrated sodium hydroxide solution. The mixture is stirred at 45° C. and pH 4.2 for 30 minutes, 6.5 g of dimethyl sulphate are added, and stirring is continued for a further 30 minutes. 188 g of 4-(N-methyl-N-β-cyanoethylamino)-benzaldehyde are then added, and the mixture is then heated to 70° C. and stirred at this temperature overnight under a water jet vacuum. As soon as the melt becomes too viscous, it is kept readily stirrable by the gradual dropwise addition of 30 g of β-hydroxypropionitrile and 60 g of ethylene glycol. The next morning the melt is diluted with 120 g of ethylene glycol, 120 g of propylene glycol, 225 g of glacial acetic acid and 370 g of water, and this gives a stable liquid formulation of the dyestuff of the formula

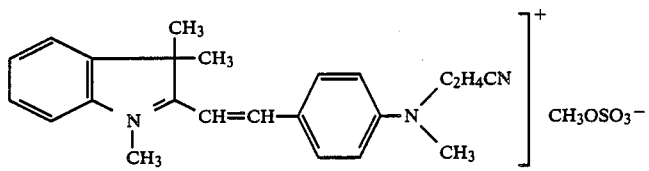

which is highly suitable for dyeing polyacrylonitrile in brilliant red shades. (C.I. hue indication chart No. 49).

EXAMPLE 34

143.2 g of dimethyl sulphate are added dropwise under $N_2$ starting at room temperature in the course of 20–30 minutes to 181.8 g of 2,3,3-trimethylindolenine (about 87.5% pure $\geq$ 159 g of 100% pure). During this addition the cooling with water is controlled in such a way that the temperature rises to 45° C. and is maintained at this value. At the same time the pH is maintained at a value of 4, in the end 4.2, by the dropwise addition of about 35 g of triisopropanolamine which are kept liquid by mixing with about 8 ml of water. When the batch has been stirred at 45° C. and pH 4.2 for 30 minutes, a further 6.5 g of dimethyl sulphate are added dropwise, and stirring is continued at 45° C. and pH 4.2 for a further 30 minutes. The residual indolenine content then is 0.2%. 177 g of 4-diethylaminobenzaldehyde (99% pure) are then added, and the mixture is heated to 75° C. and stirred at this temperature for 5 hours under a water jet vacuum and then at 70° C. overnight. As soon as the melt becomes too viscous, 20 g of ethylene glycol are slowly added dropwise. The next morning the melt contains a residual aldehyde content of 0.3% and 0.2% of 1,3,3-trimethyl-2-methylene-indoline. 90 g of ethylene glycol are added dropwise at 70° C., the mixture is stirred at 70° C. for 2 hours and then diluted with 230 g of glacial acetic acid, and 20 g of an alkylphenol polyglycol ether, 1 g of a defoamer and 26 g of hydroxypropionitrile are added. The batch is filtered at room temperature to give 970 g of a stable liquid formulation of the dyestuff indicated by formula in Example 32 and which dyes acid-modified synthetic fibres blueish-tinged red.

We claim:
1. In the preparation of cationic methine dyestuffs of the general formula

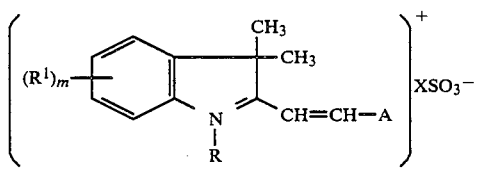

in which
R represents an alkyl radical which has 1 to 4 C atoms and is optionally substituted by hydroxyl, alkoxy having 1 to 4 C atoms, acyloxy, halogen, cyano, carboxyl, $C_1$- to $C_4$-carbalkoxy, carboxamido or acetyl, $R^1$ represents hydrogen, alkyl having 1 to 4 C atoms, halogen, alkoxy having 1 to 4 C atoms, hydroxyalkoxy having 2 to 4 C atoms, an optionally halogen-, $C_1$- to $C_4$-alkoxy- or $C_1$- to $C_4$-alkoxy-substituted phenoxy, benzyloxy or benzyl radical, carboxyl, an alkyl carboxylate having 1 to 4 C atoms, a carboxamide group which is optionally substituted by 1 or 2 $C_1$- to $C_4$-alkyl radicals, a sulphonamide group which is optionally substituted by 1 or 2 $C_1$- to $C_4$-alkyl radicals, alkylsulphonyl having 1 to 4 C atoms, phenylsulphonyl or a cyano, trifluoromethyl, acetyl or benzoyl group, A represents a radical of the formula

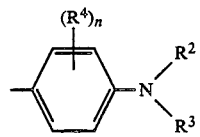

in which the radicals
$R^2$ and $R^3$ independently of each other represent an alkyl radical which has 1 to 4 C atoms and is optionally substituted by hydroxyl, $C_1$- to $C_4$-alkoxy, halogen, cyano, phenyl, carbalkoxy having 1 to 4 C atoms, carboxamido, acyloxy, benzyloxy, sulphonamido or acylamino, $R^2$ also represents an optionally halogen-, $C_1$- to $C_4$-alkyl- or $C_1$- to $C_4$-alkoxy-substituted phenyl or benzyl radical, or together with the adjacent C atom of the benzene ring can form a 5- or 6-membered ring, and $R^4$ denotes hydrogen, an alkyl radical having 1 to 4 C atoms, an alkoxy radical having 1 to 4 C atoms or halogen, or a radical of the formula

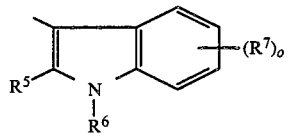

in which
$R^5$ represents an alkyl radical having 1 to 4 C atoms, an optionally halogen-, $C_1$- to $C_4$-alkyl- or $C_1$- to $C_4$-alkoxy-substituted phenyl radical or a carbalkoxy radical having 1 to 4 C atoms, $R^6$ represents hydrogen or an alkyl radical which has 1 to 4 C atoms and is optionally substituted by hydroxyl, halogen, alkoxy having 1 to 4 C atoms, cyano or acyloxy, and $R^7$ represents hydrogen, halogen, $C_1$- to $C_4$-alkyl, $C_1$- to $C_4$-alkoxy, carbalkoxy having 1 to 4 C atoms, $C_1$- to $C_4$-alkylsulphonyl, phenylsulphonyl, acetyl or benzoyl, or a radical of the formula

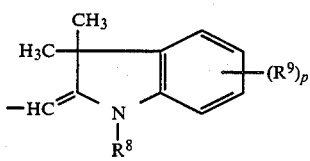

in which
  $R^8$ and $R^9$ independently of each other have the same respective meaning as R and $R^1$,
in which
  X denotes phenyl, phenyl substituted by 1 to 3 alkyl radicals having 1 to 4 C atoms, alkoxy radicals having 1–4C atoms, and m, n, o and p independently of one another denote 1 to 4, and, alkyl having 1–4C atoms or alkoxy having 1–4C atoms, m, n, o and p independently of one another denote 1 to 4, and
in which
  acyloxy is acetoxy, propionyloxy, benzoyloxy or carbamoyloxy,
by condensing a methylene compound of the formula

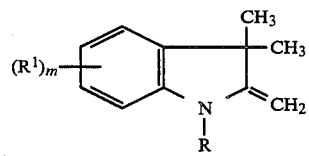

or a salt of the formula

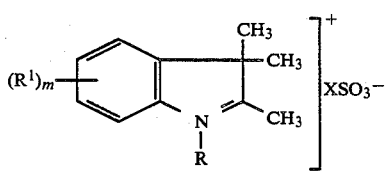

in which
  R, $R^1$, X and m have the abovementioned meaning, with a compound of the formula

A—CHO in which
  A has the abovementioned meaning, and with 1–7 mols of an acid of the formula

XSO₃H or of the salt with 0–6 mols of the acid the improvement which comprises homogeneously mixing the reactants as a viscous melt in the presence of up to 15% by weight of water relative to the total weight of the organic starting components, and removing substantially all water present, 2. Process according to claim 1 for preparing cationic methine dyestuffs of the general formula

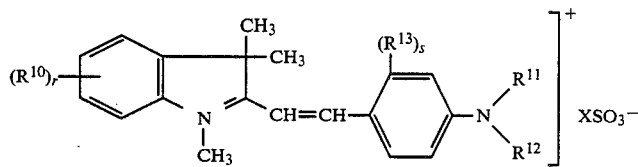

in which
  $R^{10}$ represents hydrogen, chlorine, methyl, methoxy, ethoxy or carbomethoxy,
  $R^{11}$ and $R^{12}$ independently of each other represent an alkyl radical which has 1 to 4 C atoms and is optionally substituted by hydroxyl, methyoxy, ethoxy, chlorine, cyano, phenyl or acyloxy, and
  $R^{11}$ also designates a phenyl radical which is optionally substituted by chlorine, methyl, methoxy or ethoxy, or together with the benzene ring and the nitrogen atom an optionally $C_1$-$C_4$ alkyl-substituted indoline, tetrahydroquinoline, phenomorpholine or tetrahydroquinoxaline ring,
  $R^{13}$ denotes hydrogen, methyl, chlorine, methoxy or ethoxy,
  r and s denote 0, 1 or 2, and
  X has the same meaning as in claim 1, comprising condensing a compound of the formula

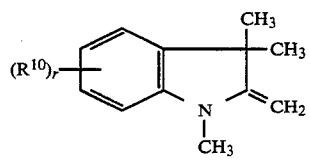

or a compound of the formula

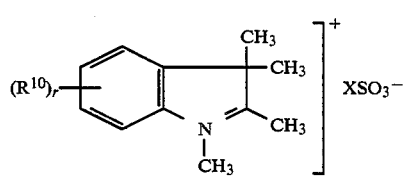

wherein
  $R^{10}$, x and r have the abovementioned meaning, with equimolar amounts of a compound of the formula

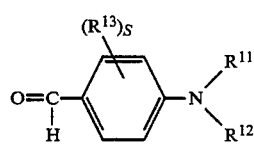

wherein
  $R^{11}$, $R^{12}$, $R^{13}$ and s have the abovementioned meaning,
and with 1 to 7 or 0 to 6 moles of an acid of the formula

XSO₃H.

3. Process according to claim 1, characterised in that acids are used which have the formula XSO₃H wherein X represents a phenyl radical which is optionally substituted by 1 to 3 alkyl radicals having 1 to 4 C atoms, alkoxy radicals having 1 to 4 C atoms, halogen or hydroxyl, or the methyl group.

4. Process according to claim 1, comprising first reacting compounds of the general formula

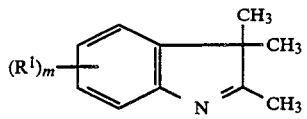

in which

R¹ and m have the same meaning as in claim 1,

XSO₃R wherein

X and R have the same meaning as in claim 1, to give compounds of the general formula

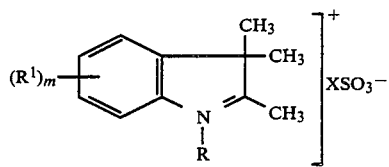

wherein

R, R¹, m and X have the same meaning as in claim 1, and then condensing these compounds without intermediate isolation with A—CHO aldehydes indicated in claim 1.

5. Process according to claim 4, wherein compounds of the formulae

A—CHO,

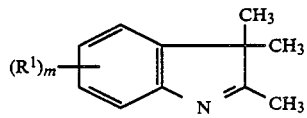

and

XSO₃R wherein

A, R, R¹, m and X have the meaning indicated in claim 1, are mixed and condensed.

* * * * *